(12) United States Patent
Ogiwara

(10) Patent No.: US 8,767,378 B2
(45) Date of Patent: Jul. 1, 2014

(54) ELECTRICALLY CONDUCTIVE PASTE COMPOSITION

(71) Applicant: E I du Pont de Nemours and Company, Wilmington, DE (US)

(72) Inventor: Toshiaki Ogiwara, Kanagawa (JP)

(73) Assignee: E I du Pont de Nemours and Company, Wilmington, DE (US)

( * ) Notice: Subject to any disclaimer, the term of this patent is extended or adjusted under 35 U.S.C. 154(b) by 131 days.

(21) Appl. No.: 13/667,563

(22) Filed: Nov. 2, 2012

(65) Prior Publication Data

US 2014/0126113 A1    May 8, 2014

(51) Int. Cl.
*H01G 9/00* (2006.01)

(52) U.S. Cl.
USPC ........... 361/523; 361/525; 361/517; 361/528; 361/529; 361/535

(58) Field of Classification Search
USPC ......... 361/523, 516–519, 525, 528–529, 530, 361/535–536, 540
See application file for complete search history.

(56) References Cited

U.S. PATENT DOCUMENTS

| | | | | |
|---|---|---|---|---|
| 6,911,281 B2 * | 6/2005 | Sonoda et al. | ................ | 429/199 |
| 7,023,689 B2 * | 4/2006 | Matsumoto et al. | .......... | 361/523 |
| 7,511,944 B2 * | 3/2009 | Kuriyama | ..................... | 361/535 |
| 7,554,793 B2 * | 6/2009 | Chacko | ........................ | 361/525 |
| 7,697,266 B2 * | 4/2010 | Ogiwara | ...................... | 361/523 |
| 8,472,165 B2 * | 6/2013 | Ning et al. | .................... | 361/525 |

FOREIGN PATENT DOCUMENTS

JP      2005/93741 A    4/2005

\* cited by examiner

*Primary Examiner* — Nguyen T Ha

(57) ABSTRACT

An electrically conductive paste composition comprises: (a) silver powders comprising spherical silver powders having a mean particle size (D50) of over 0.1 μm and no more than 5 μm and flake-shaped silver powders having a mean particle size of no more than 10 μm; and (b) binder resins comprise (b-1) aliphatic thermoplastic resin and (b-2) self-polymerizing thermosetting resin; wherein the content of the silver powders is no more than 60 wt % based on the total weight of the paste composition, wherein the weight ratio of the aliphatic thermoplastic resin for the self-polymerizing thermosetting resin ((b-1)/(b-2)) is 99/1-67/33 and wherein the weight ratio of the silver powders for the binder resins ((a)/(b)) is 94/6-85/15.

3 Claims, 3 Drawing Sheets

F I G. 2A
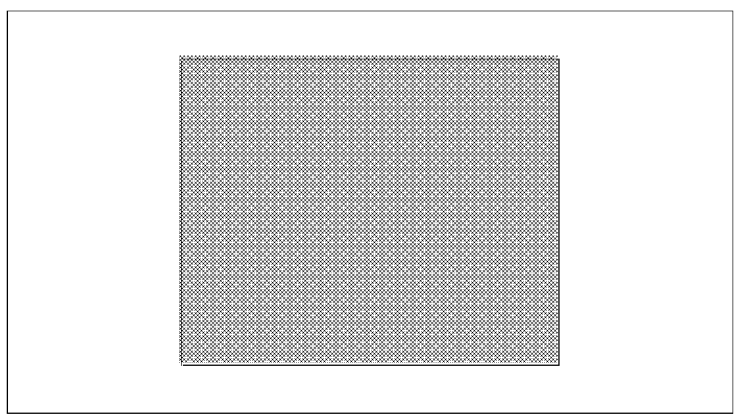
F I G. 2B

ELECTRICALLY CONDUCTIVE PASTE COMPOSITION

FIELD OF THE INVENTION

The present invention relates to an electrically conductive paste composition, particularly used for forming a solid electrolytic capacitor electrode used in various electronic instruments and electronic components.

TECHNICAL BACKGROUND OF THE INVENTION

Conventionally, solid electrolytic capacitors comprise an oxide film formed by anodization on the surface of a valve action metal such as aluminum (Al), tantalum (Ta), and niobium (Nb), a solid electrolyte such as MnO2, and an electro-conductive polymer as a counter electrode. The solid electrolytic capacitor is obtained by connecting a terminal to the solid electrolytic capacitor, sealing the entirety thereof in resin, etc. A reduction in ESR ("equivalent series resistivity") is being sought after as a trend in capacitor technology.

For example, Japanese Patent Application Laid-open No. 2005-93741 discloses a solid electrolytic capacitor that uses a silver paste, comprising a mixture of silver particles having a mean particle size of 0.2 to 20 µm, silver nanoparticles having a mean particle size of 1 to 100 nm, and a prescribed binder, to form a silver conductive layer. The use of an electrically conductive powder referred to as microparticles in this manner makes it possible to reduce contact resistance between the solid electrolyte layer and the conductive layer of the solid electrolytic capacitor. With further development of various types of electrical devices in recent years, there is a strong desire for a technology that enables the effective formation of a conductor that can be used in a wide range of fields, including not only electrodes for solid electrolyte capacitors, but also various other electronics fields, demonstrates lower resistance, and provide electrical characteristics typically required by electronic components.

SUMMARY OF THE INVENTION

In one aspect, the present invention relates to an electrically conductive paste composition comprises: (a) silver powders comprising spherical silver powders having a mean particle size (D50) of over 0.1 µm and no more than 5 µm and flake-shaped silver powders having a mean particle size of no more than 10 µm; and (b) binder resins comprise (b-1) aliphatic thermoplastic resin and (b-2) self-polymerizing thermosetting resin; wherein the content of the silver powders is no more than 60 wt % based on the total weight of the paste composition, wherein the weight ratio of the aliphatic thermoplastic resin for the self-polymerizing thermosetting resin ((b-1)/(b-2)) is 99/1-67/33 and wherein the weight ratio of the silver powders for the binder resins ((a)/(b)) is 94/6-85/15.

BRIEF DESCRIPTION OF THE DRAWINGS

FIG. 2A is a schematic drawing of a circuit formed using an electrically conductive paste composition on a substrate fabricated to measure lateral resistance.

FIG. 2B is a schematic drawing of a circuit formed using an electrically conductive paste composition on a substrate fabricated for measuring longitudinal resistance.

DETAILED DESCRIPTION OF THE INVENTION

Electrically Conductive Paste Composition

Figure 1A:
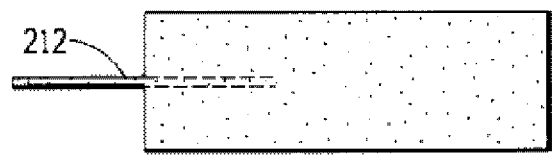
FIG. 1A to 1G is a schematic cross-sectional drawing for explaining the process for producing the electrode of a solid electrolytic capacitor by using the electrically conductive paste of the present invention.

In the first embodiment of the present invention, the electrically conductive paste composition comprises: (a) silver powders and (b) binder resins.
(a) Silver Powders The silver powders comprise both spherical silver powders and flake-shaped silver powders, in one embodiment. In the present embodiment, reduction of lateral resistance in particular is effectively achieved by using the flake-shaped silver powders. On the other hand, although the shape of flake-shaped silver powders cannot be unconditionally defined since it varies according to the production method thereof, flake-shaped silver powders are typically inferior in terms of shape uniformity. Consequently, they may have a detrimental effect on electrical conductivity in the longitudinal direction in a conductor formed therefrom. In the present embodiment, a paste that enables the efficient formation of a conductor having stable and favorable low resistance in the longitudinal direction while also ensuring superior electrical conductivity in the lateral direction is provided by combining the use of the spherical silver powders and the flake-shaped silver powders.

Furthermore, in the present description, "resistance in the lateral direction (lateral resistance)" refers to a measured value obtained by placing probes on both ends of a formed conductor (line). In addition, "resistance in the longitudinal direction (longitudinal resistance)" refers to a measured value obtained by forming a conductor on a highly conductive substrate (such as a stainless steel plate (SUS)) and placing a probe between the surface of the substrate and the surface of the conductor. The specific measurement methods thereof are specifically described in the examples of the present description.

In one embodiment, the content (wt %) of the above-mentioned silver powders is 60 wt % or less of the electrically conductive paste composition. In addition, in another embodiment, the above-mentioned content is 55 wt % or less. In the case the above-mentioned content exceeds 60 wt %, viscosity of the paste per se increases and handling as a paste tends to become poor.
(a-1) Flake-Shaped Silver Powders Examples of the above-mentioned flake-shaped silver powders include scaly shape, rod-shaped and plate-shaped silver powders. Here, flake-shaped silver powders refer to silver powders having a shape such that, when comparing the longest side of the silver powders with the shortest side, the ratio thereof (shortest side/longest side) is 1/10 or less. In one embodiment, a scaly shape is preferable in terms of practical use from the viewpoints of being able to obtain more favorable and stable low resistance comparatively easily and enabling comparatively easy production and acquisition. In one embodiment, flake-shaped silver powders of the same shape are used particularly preferably from the viewpoint of enabling lower and stable resistance (and particularly, stable longitudinal resistance) to be easily obtained. In one embodiment, the mean particle size of the above-mentioned flake-shaped silver powders is 10 µm or less. In another embodiment, the mean particle size is 8 µm or less. If the mean particle size exceeds 10 µm, problems occur such as poor printability in the case of having printed the paste or an increase in lateral resistance of the conductor formed.

On the other hand, in one embodiment, an example of the above-mentioned mean particle size is 1 µm or more. Flake-shaped silver powders in which the mean particle size is less than 1 µm are not realistic since they realistically have numerous difficulties in terms of production and handling. In addition, in the case of using to form a conductive layer of a capacitor, the powders ends up entering the capacitor if they are excessively fine, thereby leading to short-circuiting of the capacitor. In a more preferable embodiment, flake-shaped silver powders are used in which the mean particle size is 5 to 10 µm. As a result of using flake-shaped silver powders having a mean particle size within this range, printability when printing the paste and lateral resistance of the conductor are favorable, and since the powders are not excessively fine, a conductor having stable resistance is formed without the occurrence of the above-mentioned problems.

Furthermore, the mean particle size (D50) of the above-mentioned flake-shaped silver powders refers to a value equal to 50% of the particle size distribution of the silver powders, and is obtained by measuring using a Particle Size Analyzer (Laser diffraction analysis machine X-100, Microtrac Inc.).

In addition, in another embodiment, two or more types of flake-shaped silver powders having different mean particle sizes (consisting of flake-shaped silver powders having a small mean particle size (to also be referred to as "small flake-shaped silver powders") and flake-shaped silver powders having a large mean particle size (to also be referred to as "large flake-shaped silver powders") may be used in combination. In one embodiment, the mean particle size of the small flake-shaped silver powders is 4 µm or less and the mean particle size of the large flake-shaped silver powders is over 4 µm and no more than 10 µm. In another embodiment, the mean particle size of the small flake-shaped silver powders is 1 to 3 µm, and the mean particle size of the large flake-shaped silver powders is 6 to 10 µm. In this manner, if small flake-shaped silver powders and large flake-shaped silver powders are combined for use as flake-shaped silver powders, there is the advantage of being able to suitably adjust coatability and the like of the paste corresponding to conditions.

There are no particular limitations on the method used to produce the above-mentioned flake-shaped silver powders. For example, a method is used in which typical spherical or granular silver powders, obtained by liquid-phase reduction or atomization and the like, are crushed with a ball mill or attritor, and then flattened by grinding by mechanical stress.

(a-2) Spherical Silver Powders

As has been previously described, in one embodiment of the electrically conductive paste composition of the present invention, spherical silver powders may be used in combination with the previously described flake-shaped silver powders. A decrease in longitudinal resistance in particular is achieved by combining the use of spherical silver powders. Here, spherical silver powders refer to silver powders having a roughly spherical shape. More specifically, spherical silver powders refer to silver powders that are of an aggregate shape (roughly spherical) in which the distances from a certain point are roughly constant. The mean particle size (D50) of the above-mentioned spherical silver powders is over 0.1 µm to no more than 5 µm. In another embodiment, the mean particle size thereof is over 0.1 µm to no more than 4 µm. If the mean particle size exceeds 5 µm, problems occur such as an increase in resistance and a considerable decrease in paste viscosity resulting in handling difficulty. On the other hand, if the mean particle size is less than 0.1 µm, a conductor having uniform resistance cannot be formed due to aggregation of the powders. Here, mean particle size refers a value obtained by measuring using a Particle Size Analyzer (Laser diffraction analysis machine X-100, Microtrac Inc.) in the same manner as previously described.

(b) Binder Resins

In one embodiment, the binder resins comprise (b-1) aliphatic thermoplastic resin and (b-2) self-polymerizing thermosetting resin.

In the present embodiment, a paste that enables the efficient formation of a conductor having favorable heat resistance, stable, low resistance even at high temperatures and superior electrical performance is provided by combining these resins for use as binder resins.

Weight Ratio of (a) Silver Powders for (b) Binder Resins ((a)/(b))

In one embodiment, the weight ratio of (a) silver powders for (b) binder resins ((a)/(b)) is 94/6-85/15, the weight ratio ((a)/(b)) is 90/10-92/8, in another embodiment.

If the above-mentioned weight ratio (a)/(b) exceeds 94/6, coatability of the paste becomes poor or the coated film strength of the conductor formed becomes poor. As a result, the resistance of the conductor may increase. On the other hand, if the ratio is less than 85/15, since the ratio of resins in the paste becomes high, or in other words, since the ratio of the silver powders becomes low, contact among the silver powders becomes poor, and as a result thereof, resistance may increase. Lateral resistance in particular may increase considerably.

(b-1) Aliphatic Thermoplastic Resins

In the present embodiment, as a binder resin aliphatic thermoplastic resins and self-polymerizing thermosetting resins are used in combination. As a result, a paste is provided that enables the preferable formation of a conductor having stable, low resistance. Here, aliphatic thermoplastic resins refer to resins that do not have an aromatic ring in molecules thereof and undergo a reversible reaction between melting by heating and solidification by cooling. Here, if aromatic thermoplastic resins are used as the thermoplastic resins, resistance (and particularly, lateral resistance) ends up increasing considerably.

Specific examples of aliphatic thermoplastic resins include polyvinyl butyral, polyacetoacetal, polyacrylic acid and polyvinylidene fluoride. Among these, polyacetoacetal is preferable as one embodiment from the viewpoint of viscosity retention. An example of the weight average molecular weight of the aliphatic thermoplastic resins in one embodiment is 100,000 to 150,000.

(b-2) Self-Polymerizing Thermosetting Resins

In the present invention, self-polymerizing thermosetting resins used in combination with the above-mentioned aliphatic thermoplastic resins refer to resins that initiate a polymerization reaction on their own, even in the absence of other components, as a result of heating the resins. In one embodiment, the temperature of the above-mentioned heating is preferably about 100° C. or higher, and in another embodiment, preferably 130° C. or higher.

In one embodiment, preferable specific examples of the above-mentioned self-polymerizing thermosetting resins include resole-type resins such as resole-type phenolic resins or resole-type cresylic resins. In particular, from the viewpoints of heat resistance and viscosity retention, resins having a resole-type cresylic group are preferable from the viewpoints of heat resistance and viscosity retention. The average degree of polymerization of these resins is particularly preferably such that n is 10 or less.

Weight Ratio of Aliphatic Thermoplastic Resin for the Self-Polymerizing Thermosetting Resin ((b-1)/(b-2))

In one embodiment, the weight ratio of the aliphatic thermoplastic resin for the self-polymerizing thermosetting resin ((b-1)/(b-2)) is 99/1-67/33, the weight ratio of ((b-1)/(b-2)) is 89/11-80/20 in another embodiment.

If the weight ratio (b-1)/(b-2) exceeds 99/1, paste handling and coatability may become poor due to a considerable increase in paste viscosity. On the other hand, if the ratio is less than 67/33, heat resistance may become inferior due to the occurrence of problems with coatability or increased resistance of the conductor formed since the paste viscosity becomes considerably low.

(c) Other Additives

The solvent is not particularly limited thereby provided it is a solvent that can dissolve the above binder resins. Examples include ester solvents such as butyl acetate and ethyl acetate; ketone solvents such as methyl isobutyl ketone and cyclohexanone; aromatic solvents such as toluene and xylene; and glycol ether solvents including the acetate esters thereof such as the ethylene glycol butyl ether and propylene glycol methyl ether acetate. The organic solvent can be used either alone or in combinations thereof.

In addition, defoaming agents and dispersing agents can also be used as optional additives provided the properties of the conductive paste are not compromised thereby. Moreover, additional solvent can be added to adjust the viscosity. The amount of additives can be suitably determined by the persons skilled in the art. A plurality of additive types can also be used. The optional additives can be added at any time during preparation of the electrically conductive paste composition.

(d) Solid Contents and Viscosity of the Conductive Paste-
Solid Contents
    (Silver powders+organic binders) in the electrically conductive paste composition.

In one embodiment, the weight ratio of solid contents (silver powders+binder resins) to solvent in the electrically conductive paste of the present invention is between 70:30 and 50:50. If the content of the above-mentioned solid contents is excessively high, coatability during paste printing may become poor. On the other hand, if the content of the solid contents is excessively low, paste viscosity may decrease considerably or the solid contents and solvent may end up separating easily. As a result, problems may occur such as the coatability of the paste becoming poor or coating unevenness occurring, thereby preventing the providing of stable resistance values.

Viscosity

The viscosity of the electrically conductive paste composition of the present invention is preferably adjusted to within the range of 1 to 20 Pa·s in one embodiment in the case the paste composition is dipped. In this case, if the above-mentioned viscosity is less than 1 Pa·s, the silver powders may end up settling in the paste. On the other hand, if the viscosity exceeds 20 Pa·s, uniform coating may become difficult.

In addition, the viscosity of the electrically conductive paste composition of the present invention is preferably adjusted to within the range of 50 to 200 Pa·s in one embodiment in the case the paste composition is printed. In this case, if the above-mentioned viscosity is less than 50 Pa·s, bleeding may occur even when printed. On the other hand, defective printing may occur if the viscosity exceeds 200 Pa·s.

The viscosity of the electrically conductive paste composition is a value obtained by measurement at 25° C., 10 rpm using a Brookfield HBT viscometer with a #14 spindle and a utility cup.

(e) Preparation of the Electrically Conductive Paste Composition

The electrically conductive paste composition can be obtained by publicly known methods. For example, silver powders are thoroughly dispersed in binder resins and solvent using a three-roll mill. When dispersion with a three roll mill is performed, in an embodiment, the silver powders and binder resins are dispersed in an amount of solvent smaller than the designated amount, and then the rest of the solvent is added to obtain the conductive paste composition with a proper viscosity.

(f) Application Example of Electrically Conductive Paste

According to the electrically conductive paste composition of the present invention as described above, a conductor having low resistance can be favorably formed. Accordingly, the resulting conductor is preferably used as an electronic component as explained below.

(f-1) Electrode of the Solid Electrolytic Capacitor

The following provides an explanation with reference to the drawings of an example of applying the electrically conductive paste composition of the present invention to an electrode of the solid electrolytic capacitor.

Figure 1B:
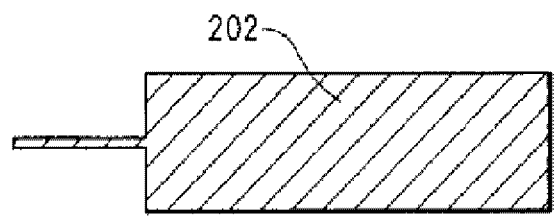
Figure 1C:
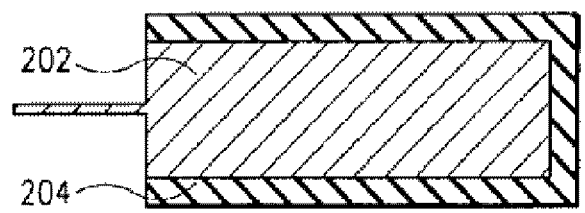

FIGS. 1A to 1G are schematic cross-section drawings for explaining the process for producing the electrode of a solid electrolytic capacitor.

a) First Process (FIG. 1A to 1C)

Figure 1D:
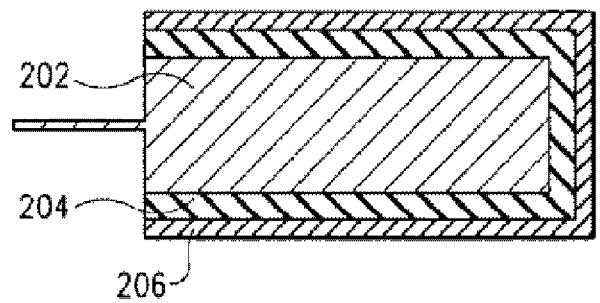

The first process is the step of providing an anode body having an oxide film acting as a dielectric formed on the surface thereof. First, tantalum powder is pressed press molded into a designated shape, a hexahedron for example, to form an anode lead wire 212 made of tantalum (FIG. 1A). Next, the press-molded body obtained thereby is sintered to obtain an anode body 202 (FIG. 1B). Then, a functional polymer layer 204 is formed in a conventional manner on the surface of the anode body 202 (FIG. 1C). Furthermore, although not shown in the drawings, the functional polymer used to form the functional polymer layer 204 uniformly permeates the anode body 202.

b) Second Process (FIG. 1D)

Figure 1E:
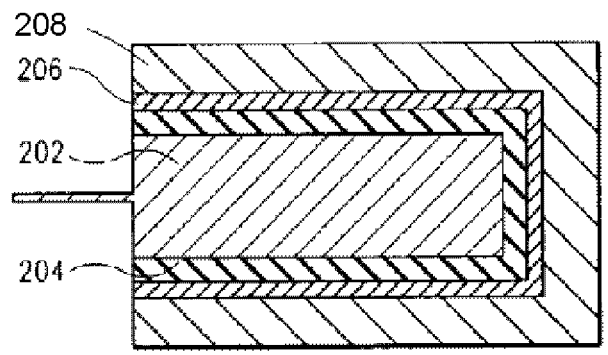
Figure 1F:
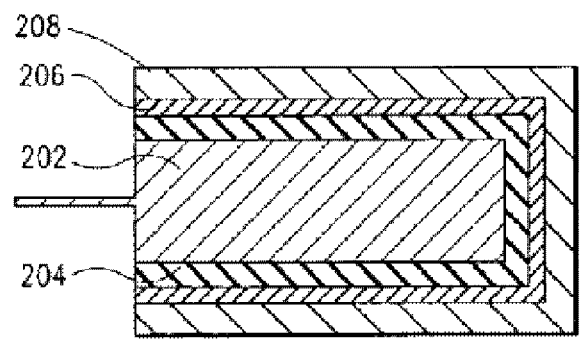
Figure 1G:
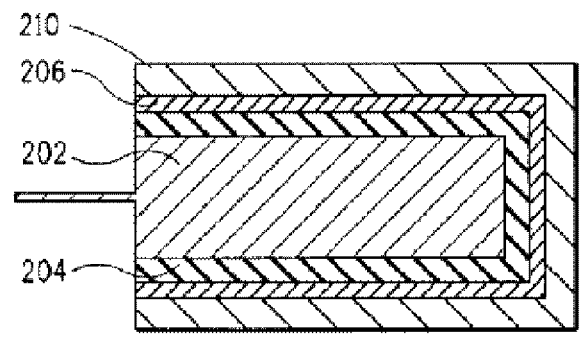

The second process is the step of forming a carbon layer 206 acting as an electrode on the functional polymer layer 204 of the anode body 202 having the dielectric oxide film obtained in the first process above. In this explanation, the functional polymer has organic polymer conductivity, examples include polythiophene, polypyrrole, polyaniline, polyphenylene vinylene or derivatives thereof.

c) Third Process (FIG. 1E to 1G)

The third process is the step of applying an electrically conductive paste composition 208 to the component with the carbon layer 206 to form a conductive paste layer 208 thereon. In an embodiment, this process is performed by dipping the component whereupon the carbon layer 206 has been formed in the conductive paste. The element is raised after the dipping for a predetermined time, and the conductive paste is dried (FIG. 1F).

This explanation uses dipping coating as an example, but other methods such as application by brush, roller coating, spray coating can also be used.

The drying of the conductive paste can be performed at 100 to 200° C., preferably 120 to 160° C. using an apparatus such as a box oven or continuous belt oven. After drying, a conductive layer 210 is obtained. As described above, a counter electrode (cathode) can be formed on the anode body having the dielectric oxide film.

(f-2) In addition to forming an electrode of the solid electrolytic capacitor as previously described, the electrically conductive paste is also preferably applied to the production of an electrode which is able to be formed by dipping coating, such as an external electrode of a chip inductor.

EXAMPLES

The present invention is explained in detail below with examples, but these examples are merely illustrations and are not intended to limit the present invention thereto.

1. Manufacturing Example:

Preparation of Paste Composition (a) Silver powders, (b) Binder resins-containing solution and (c) Other components shown in Table 1 were mixed in the compounded amounts shown in Table 1. The resulting mixtures were kneaded in a three-roll mill to obtain the Paste composition 1 to 4 and Comparative Paste composition 1 to 7 shown in Table 1.

TABLE 1

| Ex No. | | Example No. | | | | Co Example No. | | | | | | |
|---|---|---|---|---|---|---|---|---|---|---|---|---|
| | | 1 | 2 | 3 | 4 | 1 | 2 | 3 | 4 | 5 | 6 | 7 |
| | Paste No. | 1 | 2 | 3 | 4 | 1 | 2 | 3 | 4 | 5 | 6 | 7 |
| (a) | (a)-I* | 25 | — | 25 | 23 | 28 | 30 | 28 | — | — | 25 | 15 |
| | (a)-II* | 25 | 50 | 25 | 23 | 28 | 30 | 28 | — | — | 25 | 15 |
| | (a)-III* | — | — | — | — | — | — | — | — | 50 | — | — |
| | (a)-IV* | 6 | 6 | — | 5 | 6 | 7 | — | 56 | 6 | 6 | 3 |
| | (a)-V* | — | — | 6 | — | — | — | — | — | — | — | — |
| (b) | (b)-I* | 38[3.8] | 38[3.8] | 38[3.8] | 48[4.8] | 26[2.6] | — | 38[3.8] | 38[3.8] | 38[3.8] | 16[1.6] | 59[5.9] |
| | (b)-II* | 6[1.8] | 6[1.8] | 6[1.8] | 1[0.3] | 12[3.6] | 2[0.6] | 6[1.8] | 6[1.8] | 6[1.8] | 2[0.6] | 8[2.4] |
| | (b)-III* | — | — | — | — | — | 31[6.2] | — | — | — | — | — |
| (c) | (c)-I* | — | — | — | — | — | — | — | — | — | 26 | — |
| | Total | 100 | 100 | 100 | 100 | 100 | 100 | 100 | 100 | 100 | 100 | 100 |
| | (b-1)/(b-2) | 68/32 | 68/32 | 68/32 | 94/6 | 42/58 | — | 68/32 | 68/32 | 68/32 | 73/27 | 71/29 |
| | (a)/(b) | 91/9 | 91/9 | 91/9 | 91/9 | 91/9 | 91/9 | 91/9 | 91/9 | 91/9 | 96/4 | 80/20 |

The numbers in [ ] represent "weight of binder resins in solution".
(a)-I*: Small particle size flake-shaped powder (PSD D50 = 2.6 μm) (product name: SF2MA, manufactured by Ferro Corp.)
(a)-II*: Large particle size flake-shaped silver powder 1 (PSD D50 = 7.6 μm) (product name: A-4077, manufactured by Metalor)
(a)-III*: Large particle size flake-shaped silver powder 2 (PSD D50 = 14.2 μm) (product name: AA-1922, manufactured by Metalor)
(a)-IV*: Spherical silver powder 1 (PSD D50 = 0.3 μm) (product name: 11000-25, manufactured by Ferro Corp.)
(a)-V*: Spherical silver powder 2 (PSD D50 = 3.2 μm) (product name: 7000-05, manufactured by Ferro Corp.)
(b)-I*: Aliphatic thermoplastic resin*1 (S-LEC KS-5Z, Sekisui Plastics Co., Ltd.)/propylene glycol methyl ether acetate (10 wt % solution)
(b)-II*: Self-polymerizing thermosetting resin (BKR-2620, Georgia Pacific)/R0242 propylene glycol methyl ether acetate (30 wt % solution)
(b)-III*: Aromatic thermoplastic resin (product name: PKFE, Inchem, propylene glycol methyl ether acetate (20 wt % solution)
(c)-I*: Propylene glycol methyl ether acetate
(b-1)/(b-2): weight ratio of aliphatic thermoplastic resin for the self-polymerizing thermosetting resin
(a)/(b): weight ratio of the silver powders for the binder resins.

2. Evaluating Physical Properties

The lateral resistance (and longitudinal resistance) of a circuit formed using the silver paste of the present invention was measured in the manner described below. Furthermore, all measurements were carried out twice. All values shown in the table indicate the average values thereof.

2-1 Measurement of Lateral Resistance

Silver pastes of various compositions prepared in the manner previously described were coated onto glass substrates according to the procedure described below.

1) First, glass substrates measuring 75 mm×50 mm high were prepared. Each of the silver pastes having the compositions (A) shown in Table 1 were then respectively coated onto each of the prepared glass substrates so as to depict the shape shown in FIG. 2A. Furthermore, coating was carried out in the manner described below. First, a plastic film having a cutout in the shape of a circuit pattern was affixed to the surface of each glass substrate. Next, the above-mentioned pastes were coated onto the substrates after having affixed each plastic film, followed by removing the plastic film and coating the silver pastes in the shape of the circuit pattern. Here, the shape of the coated pattern was 4 mm wide and 274 mm long (total length).

2) Next, each of the substrates on which the circuit pattern had been coated and formed was heated and dried by placing in a box oven for 1 hour at 150° C. to cure the circuit pattern. As a result, an electrically conductive film circuit was formed on each glass substrate to obtain each of the samples of Examples 1 to 4 and Comparative Examples 1 to 7 for measuring lateral resistance.

Lateral resistance of the circuits was determined by placing a probe on both ends of the circuits that had been cured and formed on the glass substrates for each of the samples obtained in the manner described above. The results are shown in Table 2. Furthermore, a measured lateral resistance value (μΩcm) of less than 15 μΩcm was evaluated as being of a level that does not present problems in terms of practical use.

2-2 Measurement of Longitudinal Resistance

Silver pastes of each composition fabricated in the manner previously described were coated onto aluminum metal substrates according to the procedure described below.

1) First, aluminum metal substrates measuring 75 mm×25 mm high were prepared. Each of the silver pastes having the compositions shown in Table 1 were then respectively coated onto each of the prepared glass substrates in the shape shown in FIG. 2B. Furthermore, coating was carried out in the manner described below. First, a plastic film having a cutout in the shape of a circuit pattern was affixed to the surface of each aluminum metal substrate. Next, the above-mentioned pastes were coated onto the metal substrates after having affixed each plastic film, followed by removing the plastic film and coating the silver pastes in the shape of the circuit pattern. Here, the shape of the pattern when coated was 19 mm wide and 39 mm long.

2) Next, each of the substrates on which the circuit pattern had been coated and formed was heated and dried by placing in a box oven for 1 hour at 150° C. to cure the circuit pattern. As a result, an electrically conductive film circuit was formed on each aluminum metal substrate to obtain each of the samples of Examples 1 to 4 and Comparative Examples 1 to 7 for measuring longitudinal resistance.

Longitudinal resistance and thickness of the electrically conductive film that composes the circuit were measured with respect to the samples obtained by placing a probe between the surface of the aluminum metal substrate and the coated surface of the electrically conductive film that composes the formed circuit. The results are shown in Table 2. Furthermore, a measured longitudinal resistance value (Ω/μm) of 0.05Ω or less was evaluated as being of a level that does not present problems in terms of practical use.

TABLE 2

| | Ex. No. | | | | | | | | | | |
|---|---|---|---|---|---|---|---|---|---|---|---|
| | Ex. 1 | Ex. 2 | Ex. 3 | Ex. 4 | CoEx1 | CoEx2 | CoEx3 | CoEx4 | CoEx5 | CoEx6 | CoEx7 |
| Paste No. | Paste1 | Paste2 | Paste3 | Paste4 | CoPaste1 | CoPaste2 | CoPaste3 | CoPaste4 | CoPaste5 | CoPaste6 | CoPaste7 |
| Solid states (wt %) | 55.8 | 55.8 | 55.8 | 51.1 | 62.8 | 67.7 | 55.8 | 55.8 | 55.8 | 75 | 33.3 |
| Viscosity (Pa·s.) | 87 | 97 | 73 | 78 | 62 | 41 | 67 | 93 | 83 | 83 | 73 |
| 2-1: Lateral Resistance ($\mu\Omega$cm) | 12 | 8 | 11 | 15 | 18 | 116 | 15 | — | 24 | 24 | 102 |
| 2-2: Longitudinal Resistance ($\Omega/\mu$m) | 0.02 | 0.01 | 0.01 | 0.05 | 0.02 | 0.07 | 0.28 | 1.15 | 0.00 | 0.02 | 0.13 |

(RESULTS)

Electrically conductive films having superior low resistance were formed in Examples 1 to 4. In Example 2, in particular in which only one type of flaked-shaped silver powder having mean particle size (D50) of 7.6 μm was used for the flake-shaped silver, superior resistance values were obtained for both lateral resistance and longitudinal resistance.

Comparative Example 1 demonstrated poor handling due to the excessively high content of silver powders, and the lateral resistance of the resulting conductor was high. Comparative Example 2 is an example of the use of aromatic thermoplastic resin instead of aliphatic thermoplastic resin as the thermoplastic resin, and demonstrated considerably high lateral resistance. Comparative Example 3 is an example of using only flake-shaped silver powder for the silver powder and not using spherical silver powder. In this example, longitudinal resistance was high. Comparative Example 4 is an example of only using spherical silver powder for the silver powder. In this example, longitudinal resistance was considerably high and lateral resistance was unable to be measured. Comparative Example 5 is an example of flake-shaped silver powder having an excessively large mean particle size (D50) of 14.2 μm. Comparative Example 6 is an example of an excessively high content of silver powder relative to the content of binder resins. Comparative Example 7 is an example of an excessively high content of binder resins relative to the content of silver powders. In all of these comparative examples, resistance values (and particularly, lateral resistance) were determined to be extremely high.

What is claimed is:

1. An electrically conductive paste composition comprises:
   (a) silver powders comprising spherical silver powders having a mean particle size (D50) of over 0.1 μm and no more than 5 μm and flake-shaped silver powders having a mean particle size (D50) of no more than 10 μm; and
   (b) binder resins comprise (b-1) aliphatic thermoplastic resin and (b-2) self-polymerizing thermosetting resin;
   wherein the content of the silver powders is no more than 60 wt % based on the total weight of the paste composition, wherein the weight ratio of the aliphatic thermoplastic resin for the self-polymerizing thermosetting resin ((b-1)/(b-2)) is 99/1-67/33 and wherein the weight ratio of the silver powders for the binder resins ((a)/(b)) is 94/6-85/15.

2. An electrically conductive paste composition according to claim 1, wherein the mean particle size of the flake-shaped silver powders is from 5 to 10 μm.

3. A solid electrolytic capacitor comprising a conductive layer on a solid electrolyte layer, wherein the conductive layer is formed from the electrically conductive paste composition of claim 1.

* * * * *